United States Patent [19]
Schlicher et al.

[11] Patent Number: 5,142,861
[45] Date of Patent: Sep. 1, 1992

[54] NONLINEAR ELECTROMAGNETIC PROPULSION SYSTEM AND METHOD

[76] Inventors: Rex L. Schlicher, 8230 Stationhouse Ct., Lorton, Va. 22079-1204; Steven M. Rinaldi, ODC/AFSC, American Embassy, E-401 APO New York, N.Y. 09777-5000; David J. Hall, 460 Tahoe Dr., Pittsburgh, Pa. 15239; Peter M. Ranon, P.O. Box 6074, San Pedro, Calif. 90734; Charles E. Davis, 13400 Lomas Blvd., N.E. #221, Albuquerque, N. Mex. 87112

[21] Appl. No.: 691,889

[22] Filed: Apr. 26, 1991

[51] Int. Cl.$^5$ .............................................. F02K 11/00
[52] U.S. Cl. ................................... 60/203.1; 343/896
[58] Field of Search ................... 60/200.1, 203.1, 204; 315/34; 343/867, 896

[56] References Cited

U.S. PATENT DOCUMENTS

| | | | |
|---|---|---|---|
| 2,617,033 | 11/1952 | Posthumus | 343/867 |
| 3,229,297 | 1/1966 | Bell et al. | 343/896 |
| 3,366,962 | 1/1968 | Kulik et al. | 343/896 |

FOREIGN PATENT DOCUMENTS

| | | | |
|---|---|---|---|
| 139151 | 12/1979 | German Democratic Rep. | 60/200.1 |
| 8900073 | 8/1990 | Netherlands | 60/200.1 |

*Primary Examiner*—Louis J. Casaregola
*Attorney, Agent, or Firm*—Bernard E. Franz; Donald J. Singer

[57] ABSTRACT

An electromagnetic propulsion system based on an extremely low frequency (elf) radiating antenna structure driven by a matched high current pulsed power supply is described. The elf antenna structure resembles a modified three dimensional multiple-turn loop antenna whose geometry is optimized for the production of reaction thrust rather than the radiation of electromagnetic energy into space. The antenna structure is current driven rather than voltage drive. Rigid three dimensional geometric asymmetry, made up of flat electrical conductors that form a partially closed volume in the loop antenna structure, trap magnetic flux thereby causing a magnetic field density gradient along a single axis. This magnetic field density gradient then causes an imbalance in the magneto-mechanical forces that normally result from the interactions of the loop antenna's internal magnetic field with the current in the conductors of the loop antenna structure, as described by the Lorentz Force Law. The pulsed power supply is designed to provide the proper waveform to the antenna structure at an impedance matching the load impedance of the antenna. The rise time and shape of the input current waveform is crucial to maximizing the production of reaction thrust. Input voltage is at a nominal value sufficient to allow the desired high input current.

14 Claims, 10 Drawing Sheets

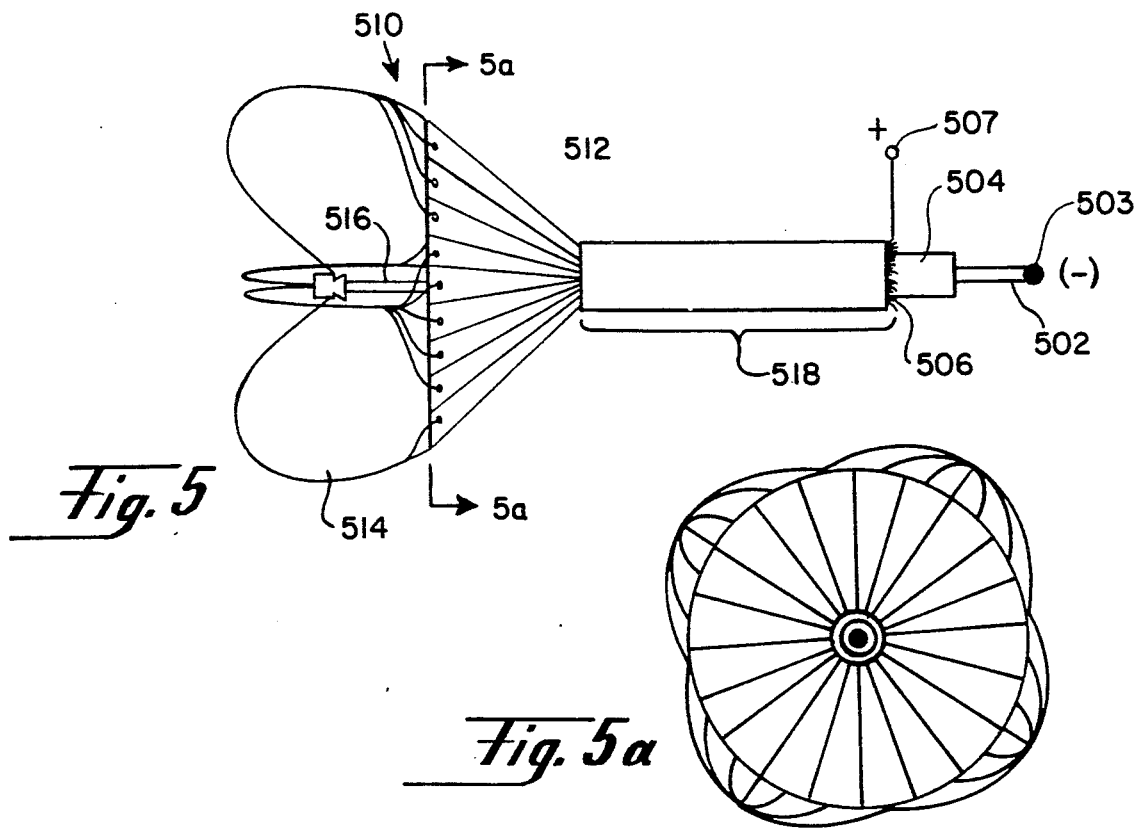
Fig. 5
Fig. 5a
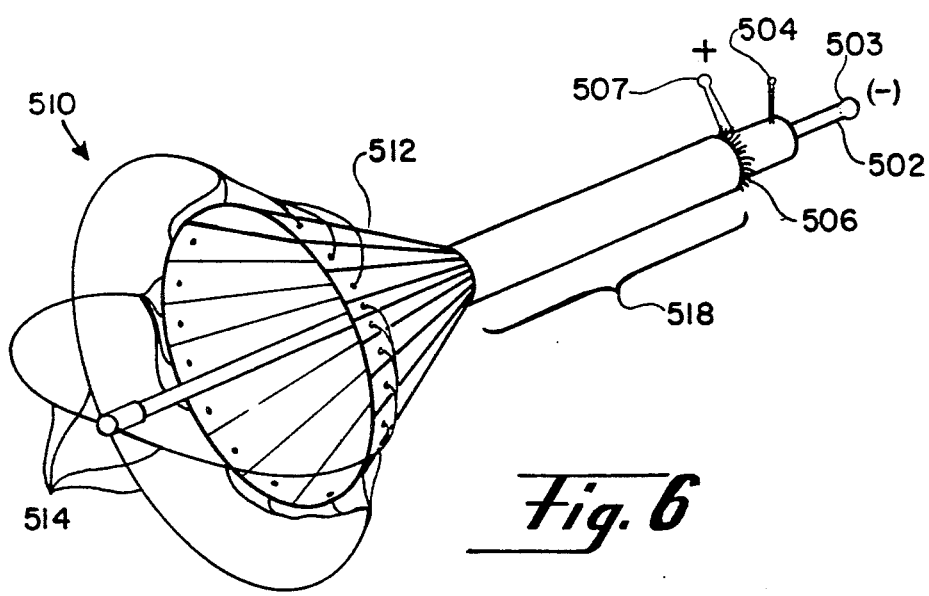
Fig. 6

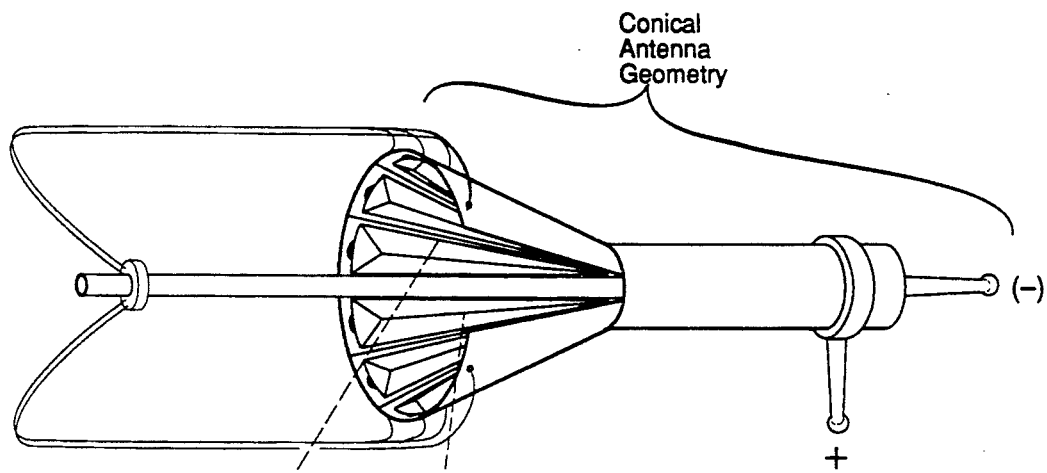
Fig. 17
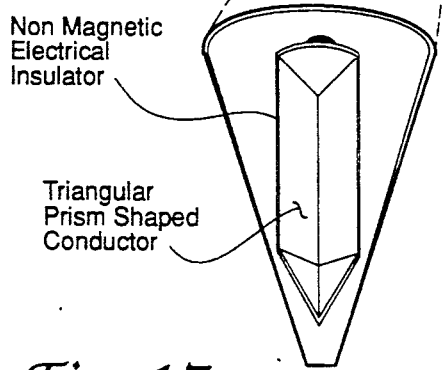
Fig. 17a Full View of Inner Surface
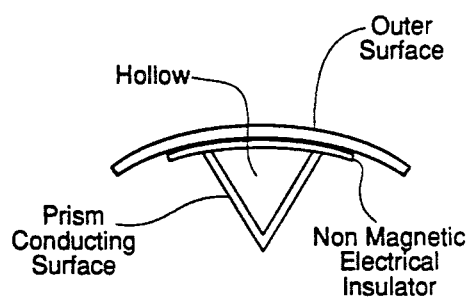
Fig. 17d Cross Section
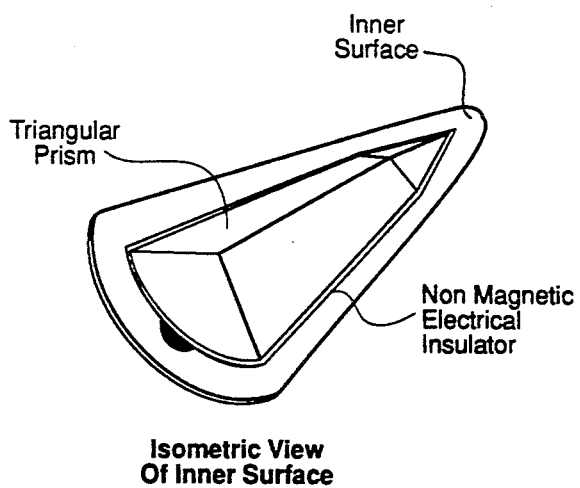
Fig. 17b Isometric View Of Inner Surface
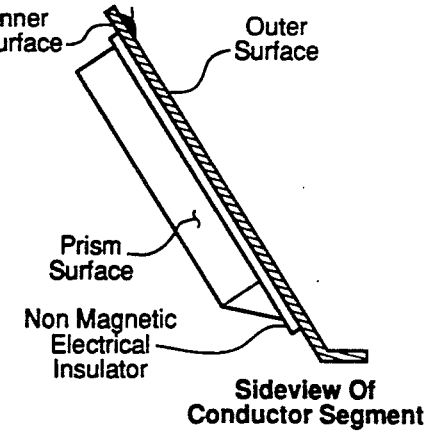
Fig. 17c Sideview Of Conductor Segment

NONLINEAR ELECTROMAGNETIC PROPULSION SYSTEM AND METHOD

RIGHTS OF THE GOVERNMENT

The invention described herein may be manufactured and used by or for the Government of the United States for all government purposes without the payment of any royalty.

BACKGROUND OF THE INVENTION

The present invention relates generally to a nonlinear electromagnetic propulsion system (NEMPS) and method.

Proposed future space missions identify a need for long duration propulsion systems that can be reliably utilized for space missions to the outer planets and beyond to interstellar objects. Satisfying this deep space mission technology need also enhance the current methods used in the station keeping of large orbital objects and provide a technology option for economical orbit transfer of large objects both around the earth and between the inner planets of the solar system. Present day primary systems and methods for long duration thrust in space are based on electrical powered rocket motors such as ion engines and electric arcjets. All electric powered rocket motor systems suffer from two major drawbacks that limit performance to a few months in duration at best. Both must carry, along as part of the space vehicle, a significant but limited amount of matter for reaction mass needed for the momentum impulse of the propelling force. Also, the rocket motor nozzle velocity for the ejected mass is a minuscule fraction of the speed of light.

Propulsion systems that satisfy the aforementioned needs would necessarily be electromagnetic in nature and provide a mechanism for the direct conversion of prime electrical power propulsive force. Propulsion systems based on laser devices have already been proposed. Laser devices by the very nature of their fundamental geometry and the mechanisms for converting prime energy into electromagnetic energy are optimal for the radiation of electromagnetic energy rather than the production of propulsive force.

Hence, there exists a need for an electromagnetic device whose geometry and energy conversion mechanisms are optimal for the production of propulsive thrust rather than the radiation of electromagnetic energy into space.

SUMMARY OF THE INVENTION

An objective of the invention is to provide an electromagnetic device whose geometry and energy conversion mechanisms are optimal for the production of propulsive thrust rather than the radiation of electromagnetic energy into space.

The invention is analogous to a long wavelength photon rocket, with low thrust but speed of light exhaust velocity. Whereas, for the classical rocket, the sum of the momentum of rocket and the total momentum of the expelled gases equals zero. For this invention, the sum of the mechanical momentum of the device and the momentum of the radiated electromagnetic field equals the magnitude of the momentum of the initial magnetic field. The Nonlinear Electromagnetic Propulsion Method and System creates a unidirectional propulsive force without use of particulate reaction mass, without interaction with local external force fields, and without external or internal friction interactions. The method describes a process whereby a magnetic field gradient is created within a coil wound around a special geometry. Since magnetic pressure is directly proportional to the flux density squared, a pressure gradient is achieved within this coil geometry during an electrical current flow resulting in mechanical force. The magnetic pressure is due to the Lorentz Force resulting from the magnetic field interactions with the electrical current flowing in the conductors.

BRIEF DESCRIPTION OF THE DRAWING

FIG. 3 is a symbolic and block diagram showing a Nonlinear Electromagnetic Propulsion (Method and) System for a low current prime power source, FIG. 3a is a graph of the antenna current input, and FIG. 3b is an end view of the antenna;

FIG. 4 is a symbolic and block diagram showing a Nonlinear Electromagnetic Propulsion (Method and) System for a high current prime power source;

FIGS. 5, 5a and 6 are a side view, a conical end view and an isometric view, respectively, of a conical geometry antenna structure, for the Nonlinear Electromagnetic Propulsion and) System;

FIGS. 10, 11 and 12 are a side view, an isometric view, and a cutaway view, respectively of a NEMPS hybrid antenna structure;

FIGS. 17, 17a, 17b, 17c and 17d are respectively a pictorial view, full view, isometric view, side view and cross section example of an inner surface geometry extension for flat cryogenic aluminum conductors.

DETAILED DESCRIPTION

Figure 1:
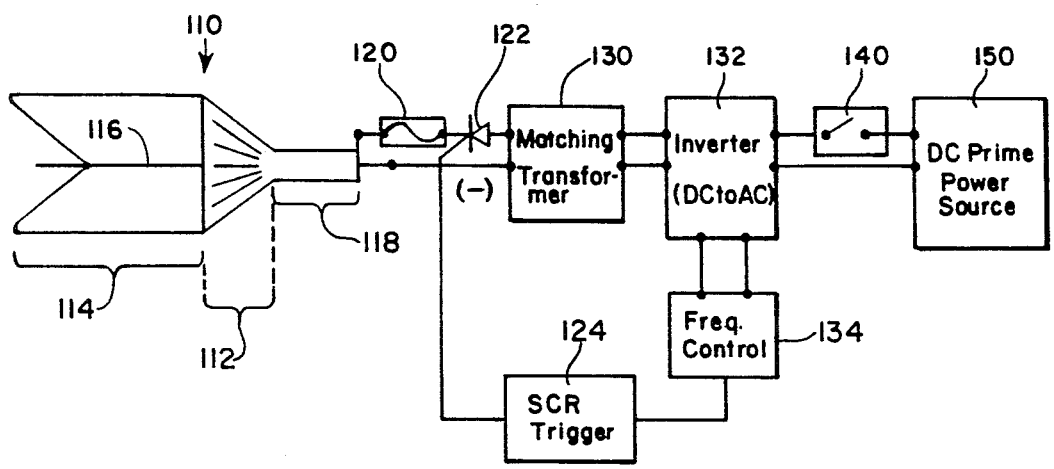
FIG. 1 is a symbolic and block diagram showing a Nonlinear Electromagnetic Propulsion (Method and) System for AC input current from a DC prime power source.

In a general sense, this invention is based on an extremely low frequency (elf) radiating antenna structure driven by a matched high current pulsed power supply. The elf antenna structure resembles a modified three dimensional multiple-turn loop antenna whose geometry is optimized for the production of reaction thrust rather than the radiation of electromagnetic energy into space. It is called nonlinear because the three dimensional geometric asymmetries of the antenna structure give rise to nonlinear mathematical descriptions of the magnetic fi density both internal and external to the device.

The rigid three dimensional geometric asymmetry in the loop antenna structure cause a magnetic field density gradient internal to the antenna structure along a single axis. This magnetic density gradient then causes an imbalance in the internal magneto-mechanical forces that normally result from the interactions of the loop antenna's internal magnetic field with the current in the conductors of the loop antenna structure, as described by the Lorentz Force Law. Since magnetic pressure is directly proportional to the magnetic flux density squared divided by twice the magnetic permeability of free space, a pressure gradient is achieved along a single axis within the antenna geometry during electrical current flow resulting in a net mechanical force along this axis.

The pulsed power supply is designed to provide the proper waveform to the antenna structure at an impedance matching the load impedance of the antenna. The rise time and shape of the input current waveform is crucial to maximizing the production of reaction thrust. Input voltage is at a nominal value sufficient to allow the desired high input current.

Thus, the system describes a set of components that together enable the process of electromagnetic propulsion to be applied in a practical manner. The method describes a process whereby a magnetic field gradient is created to cause a pressure gradient within a three dimensional asymmetric loop antenna structure.

With the appropriate prime power source this system could be used for various applications. Mated with a space nuclear reactor prime power source and with this single unit propulsion system assembled into an array or cluster, a vehicle could be conceptually propelled to the planets within this solar system and to the nearby stars. Transit time would be greatly reduced relative to other techniques of space propulsion. Since this invention does not use particulate reaction mass but the equivalent rest mass of the energy in the antenna's magnetic field, the propulsion system could run as long as there was power from the space nuclear reactor prime power source. If it were used for station keeping for near-earth satellites, this invention could conceivably extend solar-electric power sources.

SYSTEM DESCRIPTION

The Nonlinear Electromagnetic Propulsion System (NEMPS) is shown in different embodiments in FIGS. 1-4. It consists of the three dimensional asymmetric loop antenna structure which is electrically connected to a coaxial transmission line, to a pulse or impedance matching power transformer (except for the case of direct connection to the prime power supply), to a high current switch or inverter circuitry, then to a prime power source.

Figure 2:
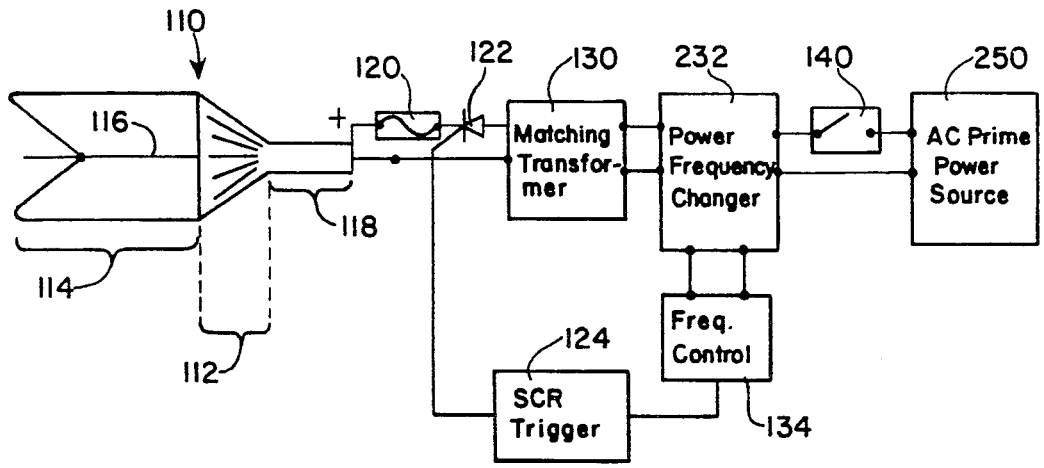
FIG. 2 is a symbolic and block diagram showing a Nonlinear Electromagnetic Propulsion (Method and) System for AC input current from an AC prime power source.

In FIGS. 1 and 2 (for AC input current) the antenna 110 is connected via a coaxial transmission line 118, a fuse 120 and an SCR switch 122 to the matching transformer 130. The antenna 110 comprises a laminated, partially closed conical volume 112 (with a ferromagnetic flux nozzle near the apex), conductor return paths 114 (two bundles), and a center return conductor 116. The control input of the SCR switch 122 is connected to an output of a SCR trigger unit 124, which has an input from a frequency control unit 134. Frequency control may provide variable thrust control. In FIG. 1, the AC input current is provided by a DC to AC inverter 132, connected via an on/off switch 140 to a DC prime power source 150. In FIG. 2, the AC input current is provided by a power frequency changer 232, connected via an on/off switch 140 to an A prime power source 250. The frequency control unit 134 is connected to the inverter 134 in FIG. 1, and to the frequency changer 232 in FIG. 2.

Figure 1A:
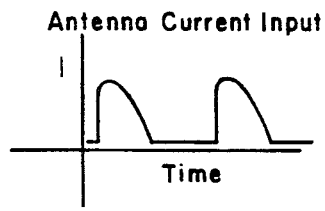
FIG. 1a is a graph of the antenna current input.
Figure 2A:
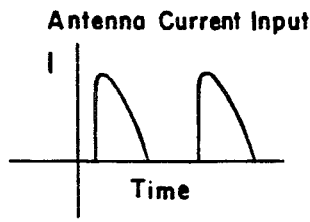
FIG. 2a is a graph of the antenna current input.

The inverter 132 in FIG. 1 and the Power Frequency Changer 232 in FIG. 2 provide a frequency controlled sawtooth waveform to the impedance matching transformer 130 attached to the coaxial transmission line 116 driving the asymmetric loop antenna 110. The waveform graphs for the embodiments of FIGS. 1 and 2 are s in FIGS. 1a and 2a respectively.

An embodiment for a low current system is shown in FIG. 3. The antenna 310 is connected via a coaxial transmission line 318 to a pulse transformer 330, which has its input connected via a current switch 332 and a fuse 320 to a prime power DC source 350. The antenna 310 comprises a partially closed conical volume 312, laminated to prevent azimuthal current flow, nonferrmagnetic conductor return paths 314 (two bundles), and a center return conductor 316. The current switch 332 has a control input from a switch control unit 334, which has an input from a repetition rate controller 332. The antenna current input is shown by a graph in FIG. 3a. An end view of the antenna 310 is shown in FIG. 3b.

FIG. 4 then illustrates direct connection of the coaxial transmission line to a high current DC power supply. The antenna 410 is connected via the coaxial transmission line 418, a current limiter 430, an on/off switch unit 440 and a fuse 450 to a high current prime power DC source 450. The current limiter 430 is included to protect the power supply. The switch circuitry 440 is controlled externally by a switch control unit 444, which may be a pulse/waveform generator or by motor speed controller as in the case of the repetitive mechanical switch. The antenna 410 comprises a partially closed conical volume 412, a conductor return path 414 (two bundles), and a center return conductor 416.

Three Dimensional Asymmetric Loop Antenna Structure

This consists of a three dimensional asymmetric multiple-turn loop antenna which is connected to one end of a coaxial transmission line. The other end of the coaxial transmission line is energized with pulsed high current input. There are three basic geometries of the three dimensional asymmetric loop antenna conical (FIGS. 5, 6 and 7), cylindrical (FIG. 8), hemispherical (FIG. 9), and hybrid (FIGS. 10, 11 and 12). The conductor material forming the cone, cylinder, hemisphere, or hybrid shape of the antenna structure need to be very rigid narrow conductors, cut and formed to the required shape with very narrow gaps between adjacent conductors to minimize flux leakage and prevent azimuth electric current flow.

The geometry of the coaxial transmission line essentially remains the same for all three antenna geometries and should be sufficiently rigid and sized for very high current.

In the ideal antenna structure for this application, the conductor return path bundles do not bend back into the internal magnetic field but extend out to infinity.

Thus, the reverse forces are zero for the ideal case. For a real antenna structure the conductor return path bundles must bend into the internal field to connect to the center conductor. This gives rise to reverse forces which must always be less than the forward forces in order for the propulsion effect to occur.

The conductor return paths in all three geometries can be simple or complex set of curves which are called conductor ret path bundles. A single conductor return path bundle is possible but not desirable because the resulting thrust vector would be askew from the main axis of the antenna structure. Sets of 2, 3, 4 etc. conductor return path bundles are preferred and should arranged symmetrically about the azimuthal dimension of the antenna structure. Whatever the general shape of the conductor return path bundles, the spacing between conductors or bundled groups of conductors must be sufficiently large to allow magnetic flux to expand out towards infinity into the space external to the antenna structure. Also, the cross section perpendicular to the magnetic flux partially bounded by the conductor return paths should be sufficiently large to decrease magnetic flux density significantly below the flux density in partially closed surfaces of the cone, cylinder, hemisphere, or hybrid volumetric shapes.

FIGS. 5, 5a (taken along lines 5a—5a of FIG. 5) and 6 are a side view, a conical end view and an isometric view, respectively of the conical geometry antenna structure. The antenna 510 comprises the laminated conical geometry 512, nonferromagnetic conductor return paths 514 (4 bundles) and a center return conductor 516. The coaxial transmission line 518 has a center conductor 502 to negative a terminal 503, insulation 504, and a coaxial conductor jacket 506 to a positive terminal 507.

Figure 7:
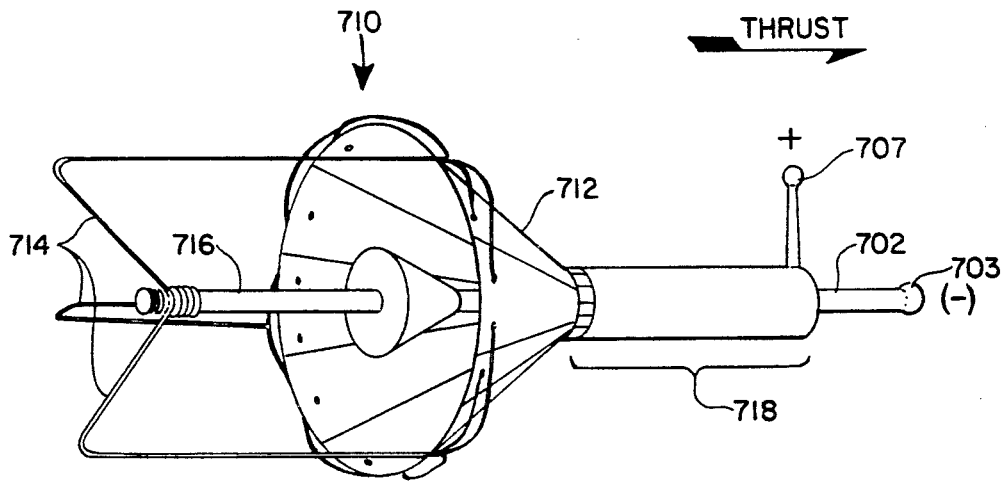
FIG. 7 is a view of the conical antenna structure with simplified return loops.

FIG. 7 is a view of the conical antenna structure with simplified return loops. The antenna 510 comprises the laminated conical geometry 712, nonferromagnetic conductor return paths (3 bundles) and a center return conductor 716. Note that the portion inside the pressure cone has a ferromagnetic nozzle. Also note that the center return conductor length outside pressure cone is longer than inside the cone. The coaxial transmission line 718 has a center conductor 702 to negative a terminal 703, and a coaxial conductor jacket to a positive terminal 707.

Figure 8:
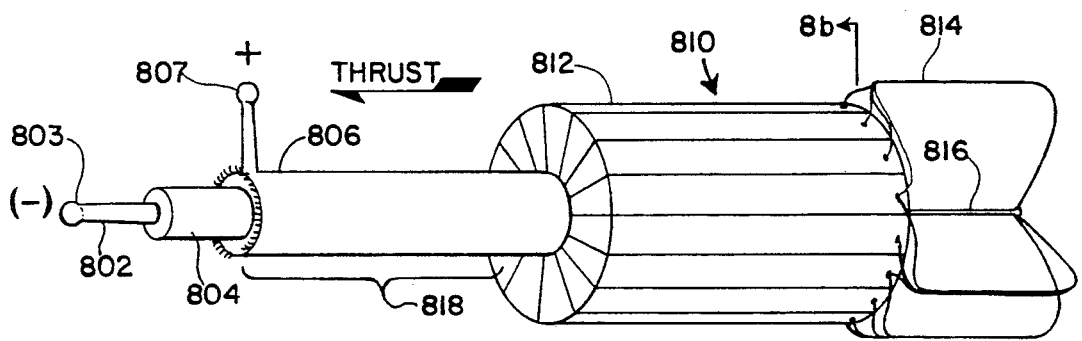
FIGS. 8, 8a and 8b are a side view from the back, a side view from the front, and an end view, respectively, of a cylindrical antenna structure, for the Nonlinear Electromagnetic Propulsion (Method and) System.
Figure 8A:
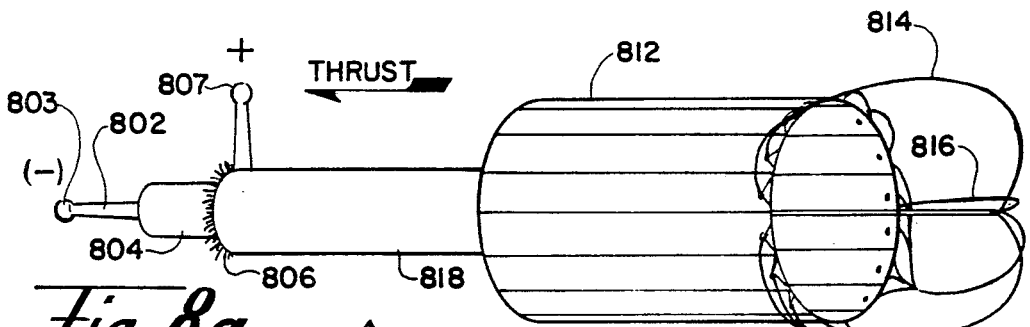
Figure 8B:
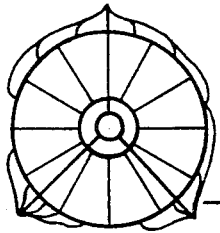

FIGS. 8, 8a and 8b are a side view from the back, a side view from the front, and an end view (taken along lines 8b—8b of FIG. 8), respectively, of a cylindrical antenna structure, for the Nonlinear Electromagnetic Propulsion (Method and) System. The antenna 810 comprises the laminated cylindrical geometry 812, nonferromagnetic conductor return paths 814 (3 bundles) and a center return conductor 816. The coaxial transmission line 818 has a center conductor 802 to negative a terminal 803, insulation 804, and a coaxial conductor jacket 506 to a positive terminal 807.

Figure 9:
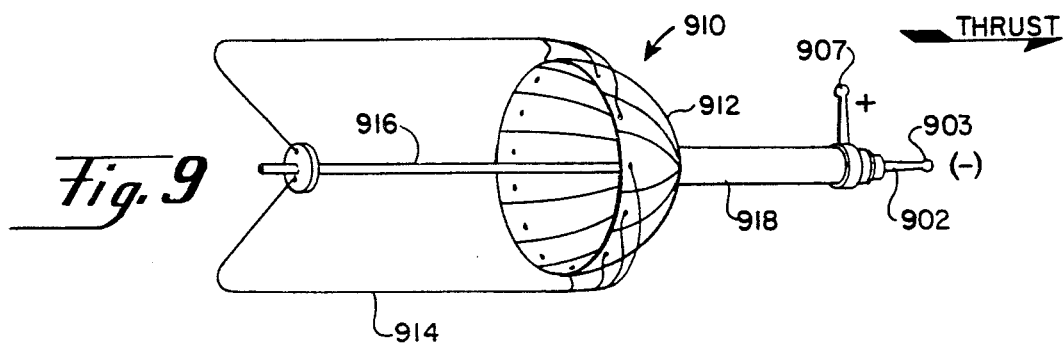
FIG. 9 is a symbolic view of a NEMPS hemispherical antenna structure.
Figure 10:
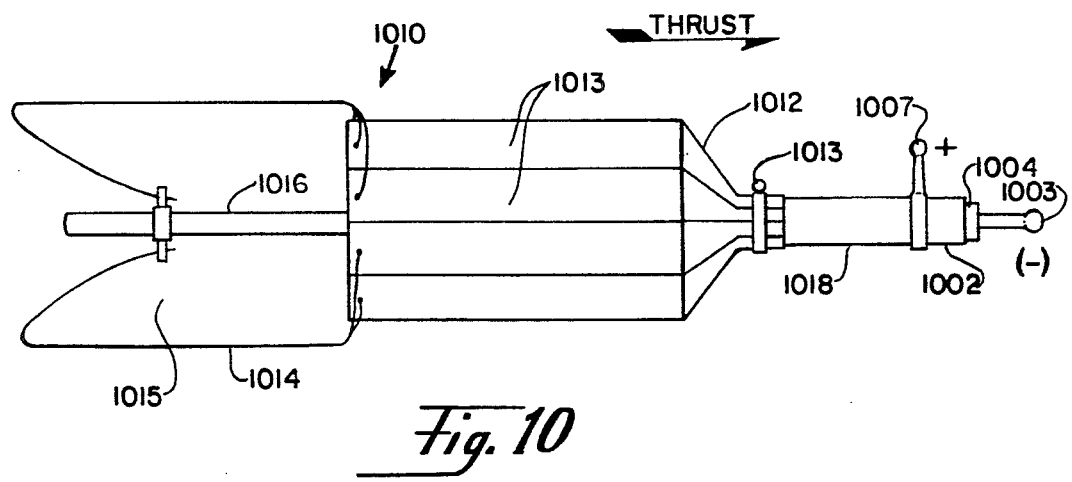
Figure 9:
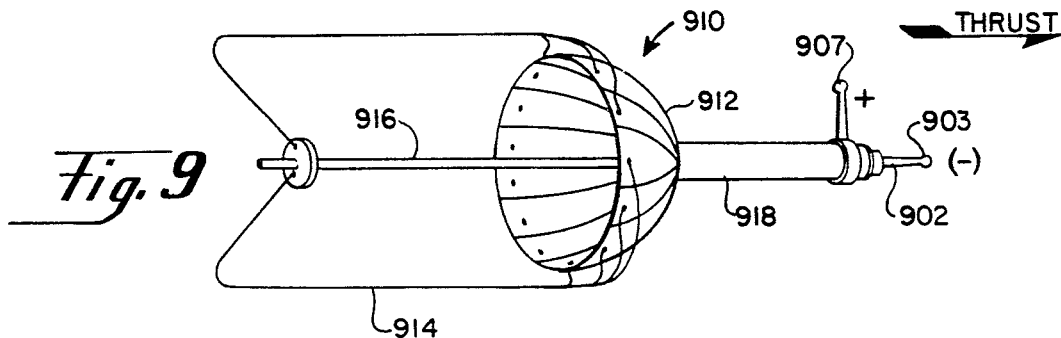
Figure 9A:
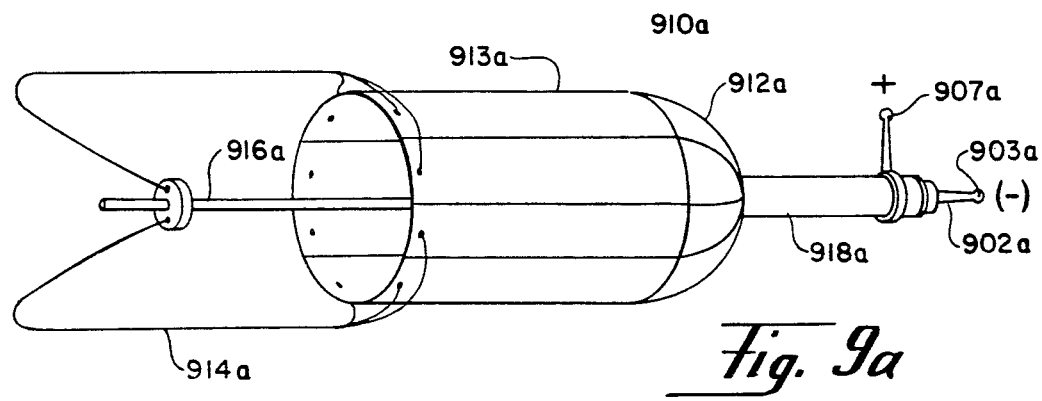
Figure 10:
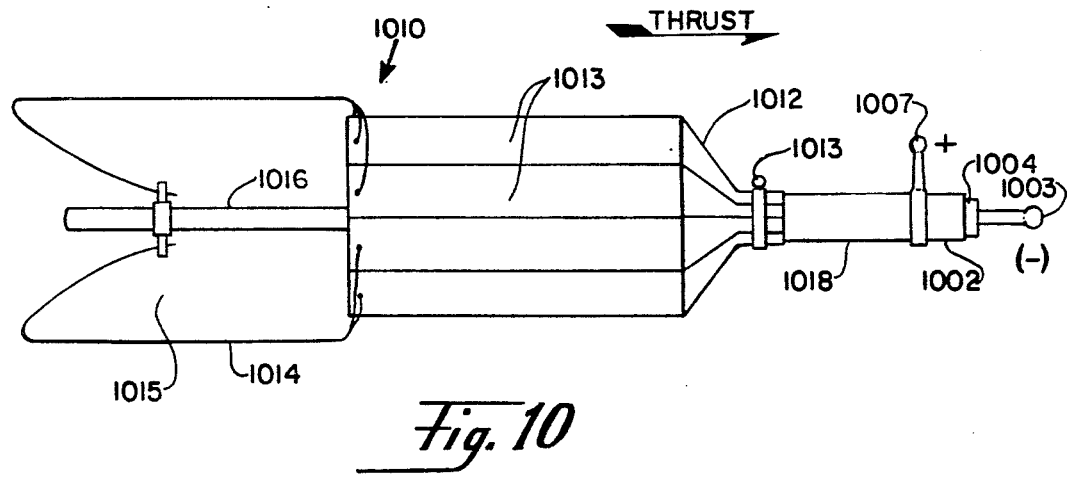

FIG. 9 is a symbolic view of a NEMPS hybrid hemispherical antenna structure. The antenna 910 comprises the laminated hemispherical geometry 912, conductor return paths 914 and a center return conductor 916. The coaxial transmission line 918 has a center conductor 902 to negative a terminal 903, and a coaxial conductor jacket to a positive terminal 907.

Figure 9A:
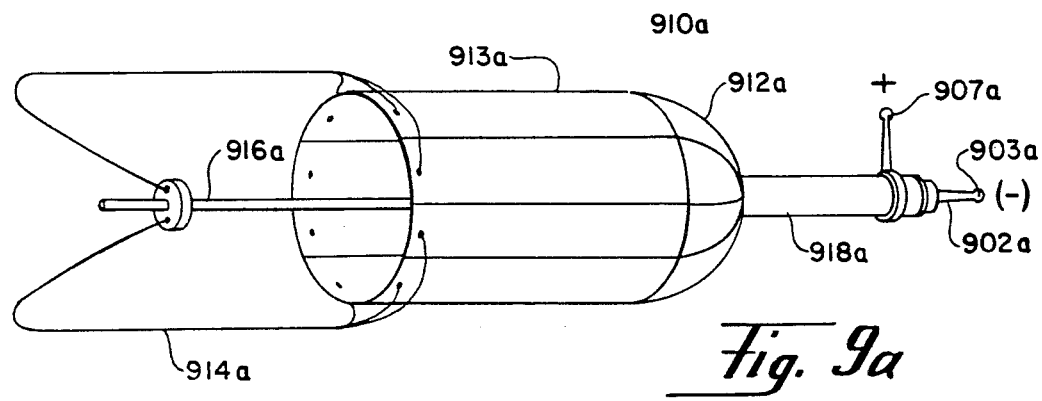
FIG. 9a is a symbolic view of a NEMPS hybrid hemispherical antenna structure.

FIG. 9a is a symbolic view of a NEMPS hybrid antenna structure (side view). The antenna 910a comprises the laminated hemispherical geometry 912a and a cylindrical portion 913a, conductor return paths 914a and a center return conductor 916a. The coaxial transmission line 918a has a center conductor 902a to negative a terminal 903a, and a coaxial conductor jacket to a positive terminal 907a.

FIGS. 10, 11 and 12 are a side view, an isometric view, and cutaway view, respectively of a NEMPS hybrid antenna structure. The antenna 1010 comprises laminated hybrid geometry with a conical portion 1012 and a cylindrical portion with flat conductor segments 1013, conductor return paths (2 bundles) 1014 and a center return conductor 1016. There is a magnetic field expansion region 1015. A ferromagnetic flux nozzle 1017 couples the center conductor of the cylindrical portion to the center return conductor 1016. The coaxial transmission line 1018 has a center conductor 1002 to negative a terminal 1003, insulation 1004, and coaxial conductor jacket to a positive terminal 1007. A clamp 1013 is shown holding the conical portion 1012 to the coaxial transmission line 1018.

Switch Circuitry Description

Textbook analog circuit designs were adapted for this system application. The application of a typical circuit are illustrated for a mechanical high current switch (FIGS. 13 and 14), a high current transistor switch (FIG. 15) (*RCA Transistor, Thyristor & Diode Manual*, RCA Corporation, Somerville, N.J., U.S.A., 1971, p. 118.), and a Silicon Controlled Rectifier (SCR) switch (FIG. 16) (D. R. Grafham, ed. and F. B. Golden, ed., *SCR Manual.* 6th edition, General Electric Company, Auburn, N.Y., U.S.A., 1979, pp. 115 and 397.).

The circuits of FIGS. 13, 14, 15 and 16 each have a prime power source 350 coupled via an on/off switch 340, the current switch, a pulse transformer 330, a blocking diode CR1 and the transmission line 318 to the NEMPS thruster 310. In each case, the primary winding of the transformer 330 is shunted by a crowbar diode CR2.

Figure 13:
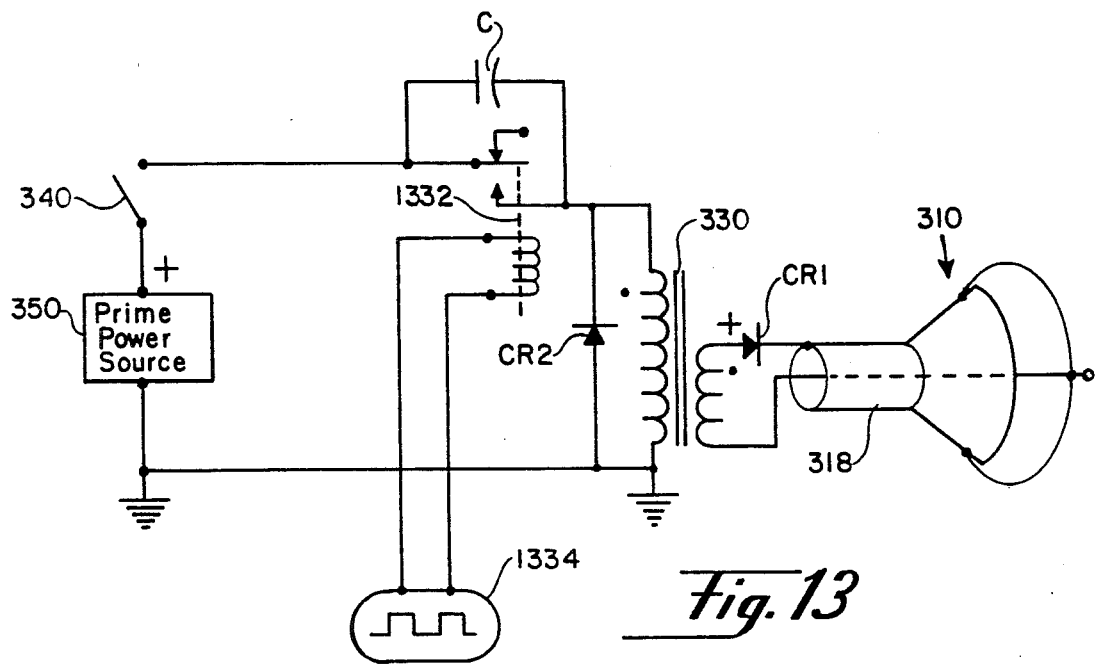
FIGS. 13, 14, 15 and 16 are functional block and schematic diagrams of various current switches used in an NEMPS system, using a mechanical relay in FIG. 13, a rotating mechanical switch in FIG. 14, a switching transistor in FIG. 15, and an SCR in FIG. 16.
Figure 14:
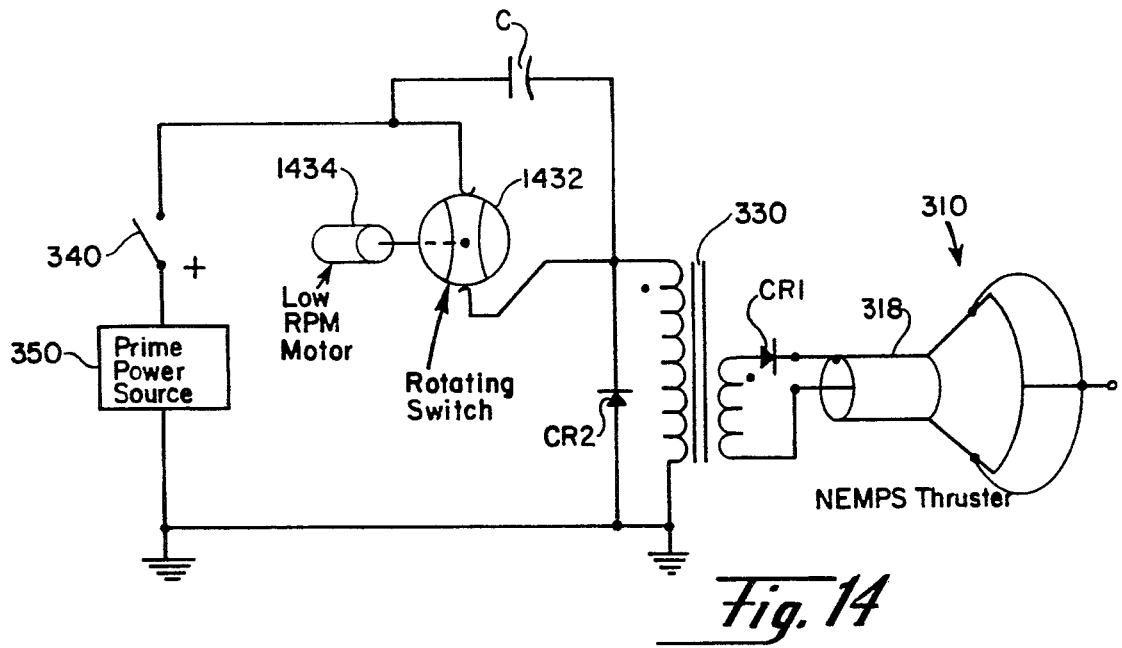

In FIG. 13 the mechanical high current switch is a mechanical relay 1332 driven by a pulse switch controller 1334. In FIG. 14 the mechanical high current switch is a rotating switch 1432 driven by a low RPM motor 1434. In FIGS. 13 and 14, a spark suppression capacitor C is connected across the contacts of the mechanical high current switch.

Figure 15:
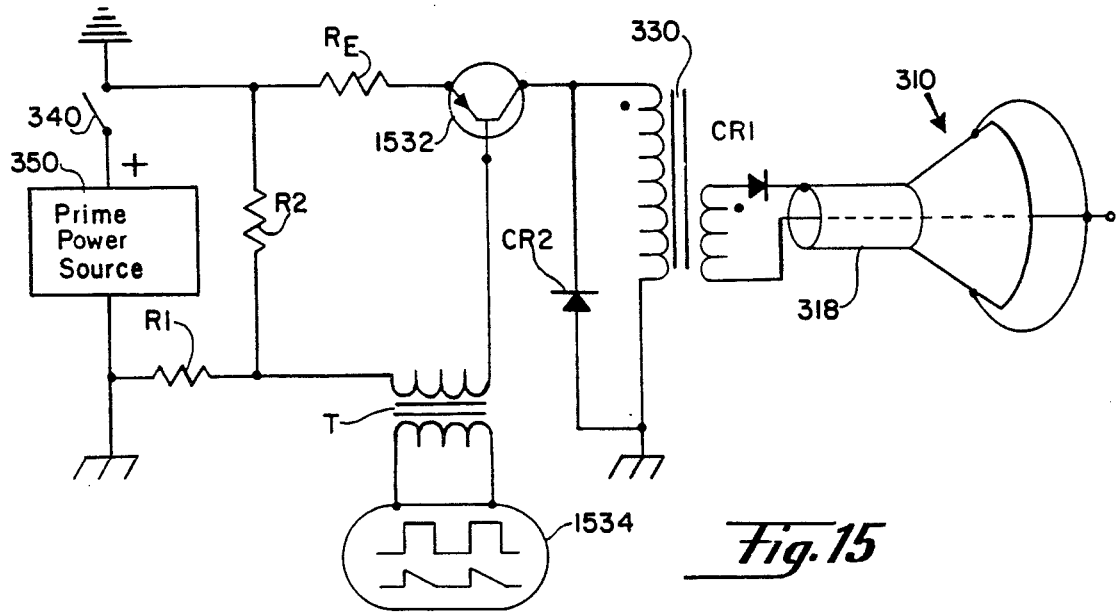

In FIG. 15 the solid state current switch is a PNP switching transistor 1532 driven by a waveform generator 1534 via a coupling transformer T. The base electrode of transistor 1532 is connected via a secondary winding of the transformer T in series with a biasing resistor R1 to ground. An emitter resistor RE is connected from the emitter electrode to ground, and a biasing resistor R2 is connected from the junction of resistor R1 and the winding of transformer T to ground. The collector electrode is connected to the primary winding of transformer 330.

Figure 16:
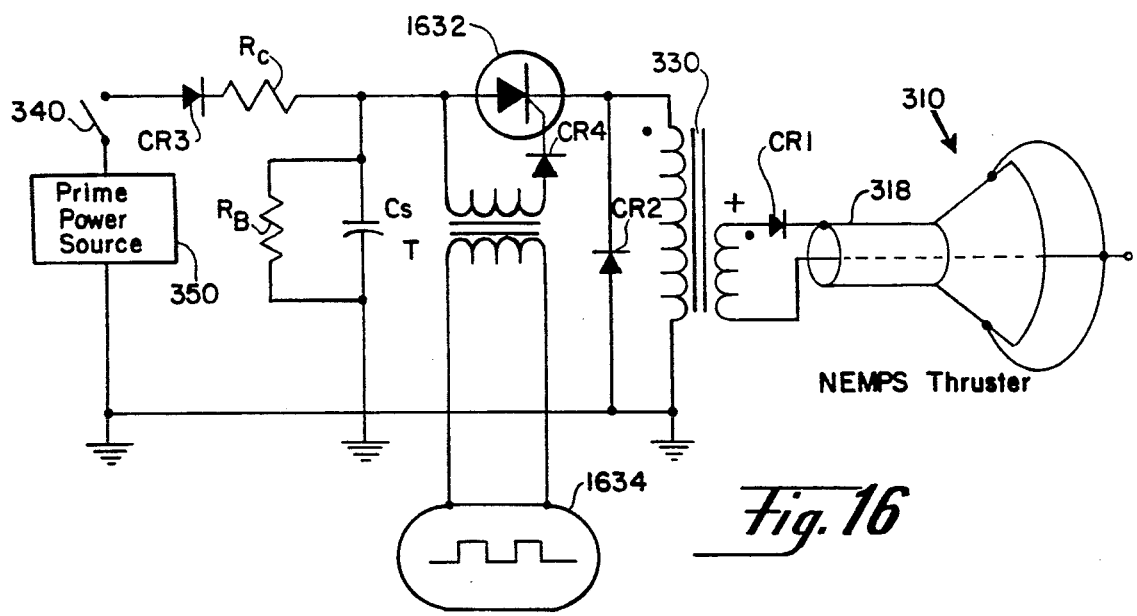
Figure 15:
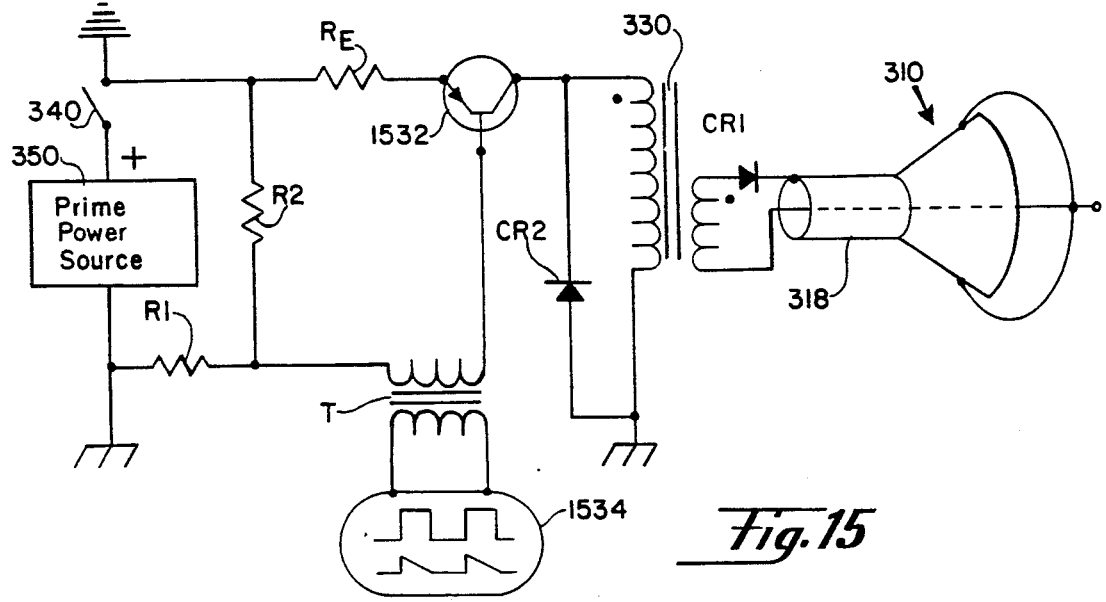
Figure 16:
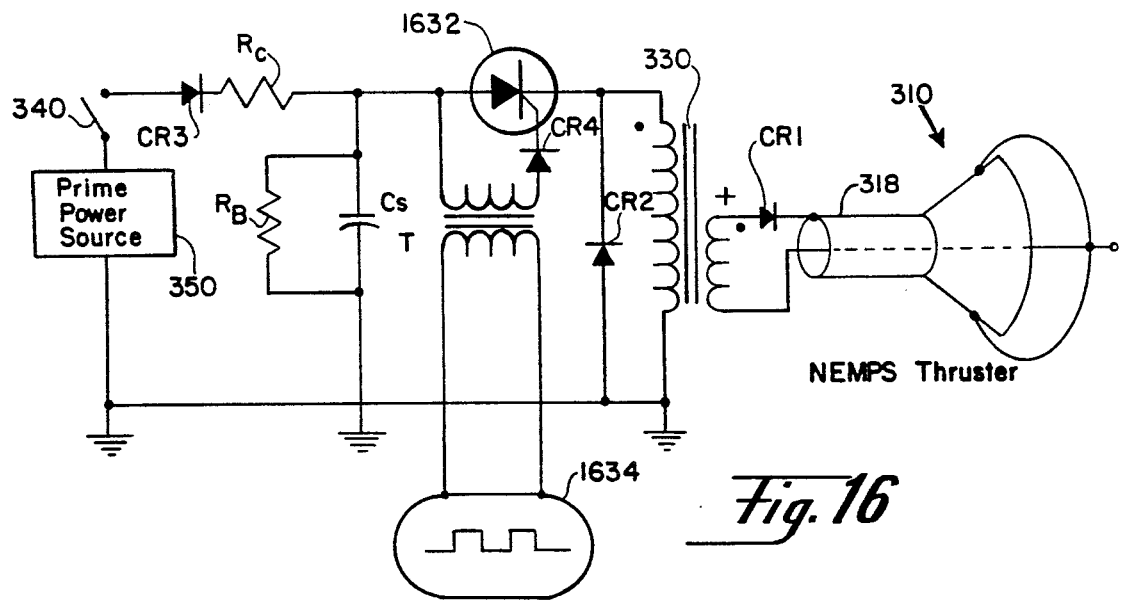

In FIG. 16 the solid state current switch is an SCR 1632 driven by a pulse generator 1634 for switch control via a coupling transformer T. The anode of the SCR 1632 is connected via a charging resistor Rc in series with a charging diode CR3 to the on/off switch 340. The anode of the SCR 1632 is also connected via a storage capacitor Cs in parallel with a charge bleeding resistor RB to ground. The secondary winding of transformer T is connected from the anode of the SCR 1632 in series with a blocking diode CR4 to the control electrode.

Pulse Transformer Driver

Figure 18:
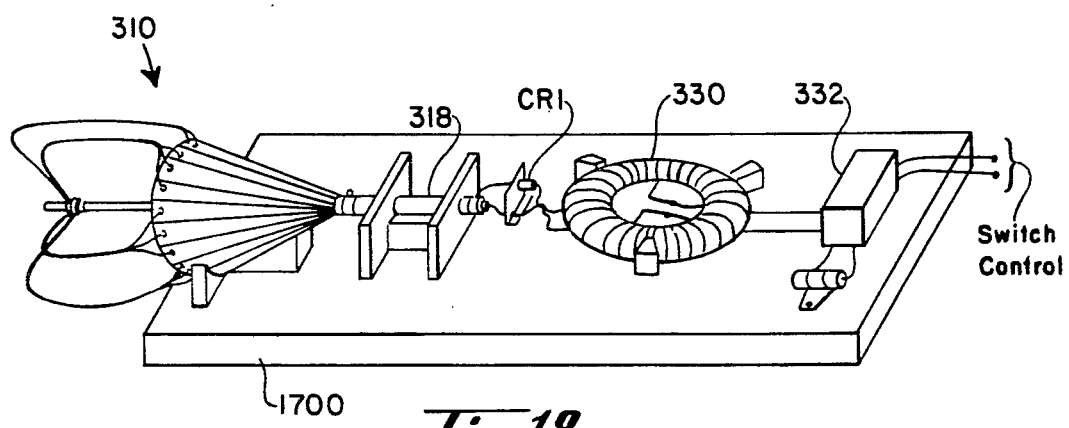
FIG. 18 is a symbolic view of a NEMPS, example hardware arrangement.

The pulse transformer uses standard design practice for high current output step down transformers. A typical system hardware drawing FIG. 18 illustrates a pulse transformer 330 with a toroidal shaped ferromagnetic core. For applications requiring higher currents, and shorter pulses/higher frequencies, an air-core pulse transformer design would be used. The conical antenna geometry 310, the transmission line 318, the blocking diode CR1, the pulse transformer 330 and the prime power source (DC) are mounted on a nonconducting/nonmagnetic platform 1700.

NEMPS Test Set-Up

Figure 19:
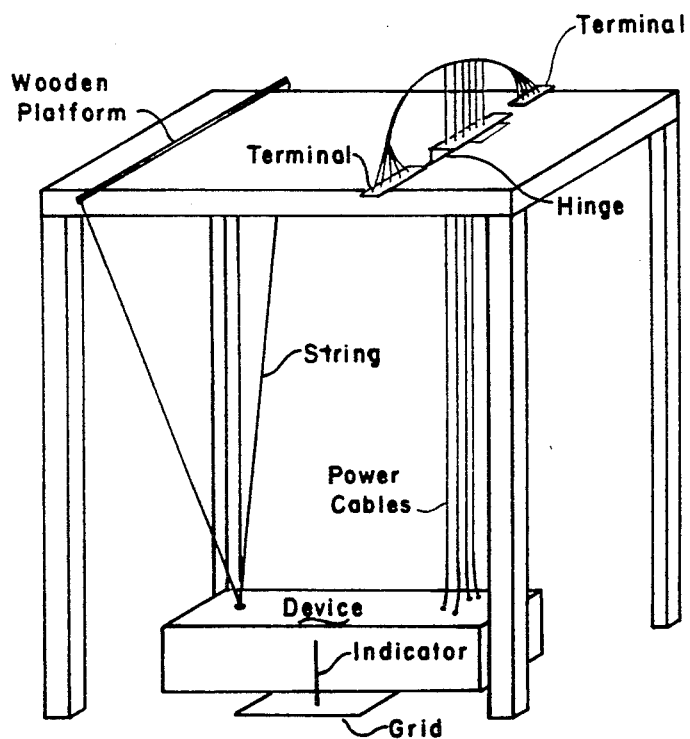
FIG. 19 is an isometric diagram of a test set-up.

FIG. 19 is an isometric diagram of a test set-up.

Working Principles

In all two dimensional loop antennas, the conductors which form the loop experience magnetic pressure due to the interaction of the magnetic field, bounded by the loop, with the current flowing in the conductors of the loop. The magnetic pressure is a direct result of the fact that magnetic fields, both static an dynamic, have intrinsic momentum density directly associated w the magnetic flux density (E. M. Pugh and G. E. Pugh, "Physical Significance of the Poynting Vector in Static Fields", American Journal of Physics, 35:153, 1967.). This basic physical relationship describing the exchange of momentum between the magnetic field and the conductors is expressed by the Lorentz Force equation for a charged particle in a magnetic field.

$$Lorentz\ Force = qE + q(V \times B)$$

Where:
q = charge
E = vector electric field intensity
V = charge velocity
B = vector magnetic field intensity
For the case of charge densities p and current densities J in conductors, the Lorentz Force can be expressed as a force density (A. Shadowitz, *The Electromagnetic Field*, Dover Publications, Inc., Mineola, U.S.A., N.Y., 1988, p. 530.).

$$Lorentz\ Force\ Density = pE + (J \times B)$$

Where:
p = charge density
E = vector electric field intensity
J = current density
B = vector magnetic field intensity
This is more representative of the unit force on a unit current element in the antenna conductors.

Secondary physical effects that contribute to the transfer o momentum and energy from the magnetic field to the conductors are expressed by Lenz's law and Faraday's induction law.

$$d\phi/dt = (-) \oint E \cdot dl$$

Where:
$\phi$ = magnetic flux linking the conductors
t = time
$f$ = line integral
E = vector electric field intensity
· = dot product
l = path of integration The minus sign is a consequence of Lenz's law which states that the direction of induced current around a closed path is such as to oppose the changing magnetic flux. In conventional conductor materials, the secondary effects enhance the conversion of magnetic field energy and momentum during a fast-rise input current waveform.

If an excessively large amount of current is pulsed into a loop antenna, the magnetic pressure will deform or even burst the antenna geometry. For two dimensional loop antennas, the integration of all the forces around the conductor path equals zero. In three dimensions, this is not necessarily the case. Also, in three dimensional loop antenna structures, no longer does a single magnetic dipole exist. It is either unipolar (i.e. the magnetic field trapped in the partially bounded volume of the NEMPS antenna structure or in a toroidal coil) or multipolar (greater than two).

Magnetic flux in the regions between and bounded by the conductor return path portion of the antenna structure expands out towards "infinity" into the space external to the antenna. Whereas, the magnetic flux in the conductor bounded partially closed volume is trapped as a toroidal field and interacts with the current in the conductors that form the bounded surface of the partially enclosed volume. The interaction transfers momentum from the magnetic field to the conductor material. The momentum density of the magnetic field correspondingly decreases as mechanical momentum becomes manifest in the antenna structure (R. P. Feynman, R. B. Leighton, and M. L. Sands, *The Feynman Lectures on Physics*, Vol II, Addison-Wesley, Reading, Mass., U.S.A. 1964, pp. 17-6 and 27-11.). Note that the flux density in the loop structure is highest at the junction of the antenna structure with the coaxial transmission line. The radiating portion of this antenna can be viewed as multipolar (greater than two) radiating magnetic source.

The most prominent asymmetric geometry is between the partially closed conductor bounded regions and the mostly open region of the conductor return paths. An imaginary plane drawn perpendicular to the central conductor at the junction of the partially closed region and the conductor return path region illustrates the differences of the geometries forming the regions within the antenna structure.

A less obvious but important asymmetry in the conical geometry relates the conductor return path pitch angle and the pitch angle of the apex of the cone. For example, the pitch angle of the antenna cone is greater than 45 degrees but less than 90 degrees. The conductor return pitch angle is less than 45 degrees but greater than zero. This minimizes cancellation forces on the return path conductors relative to the thrust producing conductors in the partially closed volume of the antenna structure. Hence, a magnetic field density gradient is induced by the three dimensional unsymmetries of the NEMPS antenna structure.

Another important aspect of the antenna structure which contributes to the development of propulsive force, is the fact it appears as a short circuit to the transmission line. As such, the antenna-transmission line subsystem behaves as a current amplifier, rapidly building up current to several times the value of the input voltage divided by the characteristic impedance for the duration of a long pulse (S. Ramo, J. R. Whinnery, and T. V. Duzer, *Fields and Waves in Communication Elec-*

*tronics*, John Wiley & Sons, Inc. New York, N.Y., U.S.A. 1965, p. 30.). Sons, Inc. New York, NY, USA 1965, p. 30.).

In summary, two distinct mechanisms contribute to the development of propulsive force: conductor geometric asymmetries and short circuit transmission line behavior.

Use of Cryogenic Conductor Materials (See J. C. Ho, C. E. Oberly, H. L. Gegel, W. T. O'Hara, J. T. Morgan, Y. V. R. K. Prasad, and W. M. Griffith, "Composite Aluminum Conductors for Pulsed Power Applications at Hydrogen Temperatures", 5th IEEE Pulsed Power Conference, IEEE Conf. Record. pp 627.)

For use as the main propulsive system in an aerospace vehicle, a practical device requires from tens to 100s of kiloamps. At room temperatures, conventional conductors such copper have significant resistivity which results in high ohmic losses at the required electrical current levels. Thus practical application of this invention would necessitate the use of cryogenic conductor materials.

Cryogenic aluminum has weight advantages as well as conduction advantages at cryogenic temperatures of about 21° kelvin. Aluminum has approximately $\frac{1}{3}$ the mass of copper for approximately the same tensile strength. It would be predominately used in the antenna structure itself with secondary considerations for the coaxial transmission line. At the cryogenic temperatures, high purity aluminum's resistivity drops to between 1/500 to 1/1000 of its room temperature value. Ohmic losses become nominal for high current input. Because aluminum still behaves as conventional conductor at cryogenic temperatures there is no risk of it going "normal" for this application which uses pulsed high input current. Its conductivity is not affected by high input current transients as would be a superconductor.

FIGS. 17, 17a, 17b, 17c and 17d are a pictorial view, full view, isometric view, side view and cross section example of an inner surface geometry extension for flat cryogenic aluminum conductors.

To more effectively convert magnetic field momentum and energy into propulsive force, geometric surface projections made of cryogenic aluminum need to be mechanically attached to the inner surfaces of the segmented flat conductors which provide the net forward thrust vector. In the case of the loop antenna conical geometry, each projection forms a hollow triangular prism whose long axis is parallel to the mean path direction of the input current within the corresponding flat conductor segment (FIG. 17). To minimize the reverse electromagnetic force during the initial input current pulse, each triangular prism is electrically isolated but mechanically connected to the inner surfaces of its corresponding flat conductor segment by a strip or nonmagnetic electrical insulator material.

During the initial part of the fast-rise input current pulse eddy currents are induced on the outer surface of the prism as prescribed by Lenz's law and Faraday's induction law. These eddy currents generate an opposite magnetic flux that tends to cancel the primary magnetic flux in the prism interior. If the input current rise time is very short, the magnetic flux of the prism interior will be cancelled to zero. The full flux of the antenna's trapped magnetic field will be external to the prism. A peak magnetic flux density of about 1.0 Tesla trapped in the partially closed volume of the conical antenna geometry will provide several atmospheres of peak pressure on the prism's outer surface (P. Lorrain and D. Corson, *Electromagnetic Fields and Waves*, 2nd Edition, W. H. Freeman and Company, San Francisco, Calif., U.S.A., 1970, p. 380, prob. 8-35). Because of the physical connection, this pressure will then mechanically transfer to the flat conductor segments thus providing increased forward thrust.

For application of pulsed input current, superconductors are not suitable because of their inherent instability to current transients. However, for DC input current superconductor materials would be ideal, particularly for the flat conductors forming the partially closed volume of the antenna structure. With the right geometry for the conductors, there would not be any magnetic diffusion into the conductors because of the Meissner effect. In principle, this would represent the optimum conditions for a magnetic flux gradient along the axis of the central conductor.

To enable the Meissner effect when using superconducting materials, the inner surfaces of the segmented flat conductors which provide the net forward thrust vector need to project into the magnetic flux trapped in the partially closed antenna volume. For the case of the loop antenna conical geometry, each projection forms a triangular prism whose long axis is parallel to the mean path direction of the input current in the attached flat conductor. The triangular prism is made of superconductor material and is mechanically a part of the flat conductor segment but is electrically isolated. Being superconducting, it expels the magnetic field from its interior during device operations using DC input current (C. Kittel, *Introduction to Solid State Physics*, 3rd edition, John Wiley & Sons, Inc. New York, N.Y., U.S.A., 1968, pp. 336, 340–341, and 353). With no magnetic flux inside each prism and full magnetic flux on its exterior, the prism outer surfaces experience mechanical pressure which transfers to the attached segmented flat conductor.

Input Current Waveforms (See E. C. Jordon, ed. *Reference Data for Engineers: Radio Electronics, Computer, and Communications*, 7th edition, Howard Sams & Co., Inc. Indianapolis, Ind., U.S.A., 1985, pp 7-6 and 7-12.)

Basic input current waveform is sawtooth with the fast-rise edge leading in time followed by a gradual decrease in the current amplitude at a steady state frequency set at between 1 and 100 hertz. Expressed differently, the input waveform can be described as a train of sawtooth pulses at a constant pulse repetition rate set at between 1 and 100 pulses per second. In both descriptions the rise time is shorter than the conductor magnetic diffusion time of the flat conductors that form the bounded surface of the partially closed volume.

The optimal input current waveform would resemble a critically damped exponential wave at a steady frequency set at between 1 and 100 hertz. Expressed differently, the input current waveforms can be described as a train of critically damped exponential pulses set at a repetition rate between 1 and 100 pulses per second. The fast-rise edge of the waveform leads in time followed by a gradual decrease in current amplitude. Rise time of the waveform in both descriptions is shorter than the magnetic diffusion time of the flat conductors forming the surface of the partially closed volume of the antenna structure.

The Possibilities of Magnetic Steering

By separately varying the current in individual return loop conductor bundles, it is possible to induce a steering force. With the current not being equal in each of the return loop conductor bundles, a sideways magneto-mechanical force occurs because current symmetry is violated. This side force acts perpendicular to the main force vector along the center conductor.

The Case of the DC Input Current (See W. K. H. Panofsky and M. Phillips, *Classical Electricity and Magnetism*, 2nd edition, Addison-Wesley, Reading, Mass. U.S.A., 1962, pp. 123-124, and 177-184.)

In the analysis of the magnetic field density for the antenna structures, the Biot Savart Law was applied for steady state dc current. For steady state dc current a magnetic field density gradient along the axis of the center conductor was predicted by the Biot Savart Law for all geometries so far described. This is reasonable since the three dimensional loop antenna structure is intrinsically an open system. The magnetic field in the expansion region formed by the return loop conductor bundles stretches out to the space external to the antenna structure and in principle to "infinity". The momentum density for this portion of the magnetic field decreases because its volume of presence includes all of free space. The momentum density in the partially closed volume is considerable higher because the magnetic field is constrained or trapped by the conductors forming the bounded surface to the volume. When the device displaces an infinitesimal distance dx, it radiates a classical electromagnetic field into the space external to the antenna structure. Magnetic field momentum density correspondingly decreases as the momentum of the antenna structure increases.

Approaches to Analysis

Being a three dimensional electromagnetic problem, a detailed analytical solution for the magnetic field pattern for even the most fundamental geometry is extremely difficult if not impossible. A simple approach for obtaining an approximate solution to a particular antenna geometry is to break down the geometry into a composite of conductor segments and analyze interactions between pairs of segments. The solutions for the pairs of conductor segments are then added up in accordance w the principle of supposition while paying careful attention to the unique features of the overall geometry. Another approach involves applying numerical analysis techniques to a particular antenna geometry using a computer. In this approach, the net force on a single current carrying conductor element is calculated relative to all other current carrying conductor elements in the geometry. The elemental forces are then summed for the whole geometry (J. R. Merrill, *Using Computers in Physics*, Houghton Mifflin Company, Boston, Mass., U.S.A., 1976, pp. 73-88.).

Using the approximate solution method, propulsive forces have been estimated for the conical and cylindrical geometries. A detailed discussion of these estimates is beyond the scope of this paper. Never the less, for an input electrical pulse with a peak current of 1000 amperes, the peak propulsive force is in the neighborhood of 0.1 to 0.4 newtons of force which converts to about an ounce or less of thrust. However, for an electrical input peak current of 10 kiloamps, the peak propulsive force ranges in the kilonewtons or hundreds of pounds of thrust. Consequently, a practical device requires a peak current of 10 kiloamps or more. At a nominal voltage of about 10 volts, this requires a prime power supply of about 100 kilowatts or more. From the magnetic force law (P. Lorrain and D. Corson, *Electromagnetic Fields and Waves*, 2nd Edition, W. H. Freeman and Company, San Francisco, Calif., U.S.A., 1970, p. 295.) the propulsive force scales approximately as a function of the input current squared minus a cancellation term which is dependent upon the antenna geometry.

It is understood that certain modifications to the invention as described may be made, as might occur to one with skill in the field of the invention, within the scope of the appended claim Therefore, all embodiments contemplated hereunder which achieve the objects of the present invention have not been shown in complete detail. Other embodiments may be developed without departing from the scope of the appended claims.

What is claimed is:

1. A nonlinear electromagnetic propulsion system, comprising antenna means driven by current pulse generating means coupled to a prime power source, with transmission line means coupling the current pulse generating means to the antenna means;

wherein the current pulse generating means includes means for providing a sawtooth wave having a relatively steep leading edge compared to the trailing edge;

wherein the antenna means comprises a three dimensional laminated geometry having an extremely low frequency (elf) radiating antenna structure in the form of a three dimensional asymmetric multiple-turn loop antenna whose geometry is optimized for the production of reaction thrust rather than the radiation of electromagnetic energy into space, with rigid three dimensional geometric asymmetry, made up of flat electrical conductors that form a partially closed volume in the loop antenna structure, which trap magnetic flux thereby causing a magnetic field density gradient along a single axis, wherein the magnetic field density gradient causes an imbalance in the magneto-mechanical forces that normally result from the interactions of the loop antenna's internal magnetic field with the current in the conductors of the loop antenna structure, as described by the Lorentz Force Law;

wherein the antenna means includes a plurality of return bundles and a center return conductor.

2. A nonlinear electromagnetic propulsion system according to claim 1, wherein the antenna structure comprises a partially closed conical volume with a ferromagnetic flux nozzle near an apex thereof.

3. A nonlinear electromagnetic propulsion system according to claim 1, wherein the antenna structure comprises a cylindrical volume.

4. A nonlinear electromagnetic propulsion system according to claim 1, wherein the antenna structure comprises a hemispherical volume.

5. A nonlinear electromagnetic propulsion system according to claim 1, wherein the antenna structure comprises hybrid structure having a conical volume followed by a cylindrical volume.

6. A nonlinear electromagnetic propulsion system according to claim 1, wherein the antenna structure comprises hybrid structure having a hemispherical volume followed by a cylindrical volume.

7. A nonlinear electromagnetic propulsion system according to claim 1, wherein the prime power source is a DC source, and th current pulse generating means comprises a DC to AC inverter having an input coupled to the prime power source, and an output coupled via a matching transformer and an SCR switch to the transmission line means, SCR trigger means coupled to a control input of the SCR switch, and frequency control means coupled the inverter and to the SCR trigger means for providing frequency control to generate the sawtooth waveform at an extremely low frequency.

8. A nonlinear electromagnetic propulsion system according to claim 1, wherein the prime power source is a AC source, and the current pulse generating means comprises a power frequency changer having an input coupled to the prime power source, and an output coupled via a matching transformer and an SCR switch to the transmission line means, SCR trigger means coupled to a control input of the SCR switch, and frequency control means coupled to the power frequency changer and to the SCR trigger means for providing frequency control to generate the sawtooth waveform at an extremely low frequency.

9. A nonlinear electromagnetic propulsion system according to claim 1, wherein the prime power source is a DC source, and the current pulse generating means comprises a current switch having an input coupled to the prime power source, and an output coupled via a pulse transformer to the transmission line means, and switch control means coupled to the current switch, wherein the switch control means includes repetition rate control means, for providing frequency control to generate the sawtooth waveform at an extremely low frequency.

10. A nonlinear electromagnetic propulsion system according to claim 9, wherein the current switch comprises a mechanical relay.

11. A nonlinear electromagnetic propulsion system according to claim 9, wherein the current switch comprises a rotating switch, and the switch control means comprises a motor.

12. A nonlinear electromagnetic propulsion system according to claim 9, wherein the current switch comprises a switching transistor.

13. A nonlinear electromagnetic propulsion system according to claim 9, wherein the current switch comprises an SCR.

14. A nonlinear electromagnetic propulsion system according to claim 1, wherein the prime power source is a high current DC source, and the current pulse generating means comprises an on-off switch having an input coupled to the prime power source, and an output coupled via a current limiting resistor to the transmission line means, and switch control means coupled to the on-off switch for providing frequency control to generate the sawtooth waveform at an extremely low frequency.

* * * * *

UNITED STATES PATENT AND TRADEMARK OFFICE
CERTIFICATE OF CORRECTION

PATENT NO. : 5,142,861  
DATED : September 1, 1992  
INVENTOR(S) : Rex L. Schlicher et al Page 1 of 3

It is certified that error appears in the above-identified patent and that said Letters Patent is hereby corrected as shown below:

Abstract, line 9, "drive" should read --driven--.  
Drawing sheet 2, the following Figures 3, 3a, 3b, and 4 should appear.

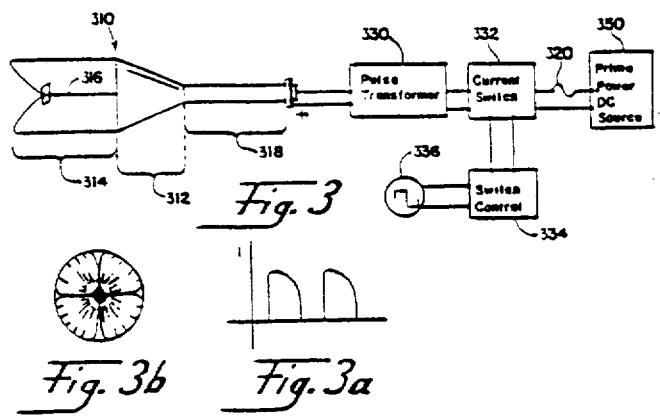

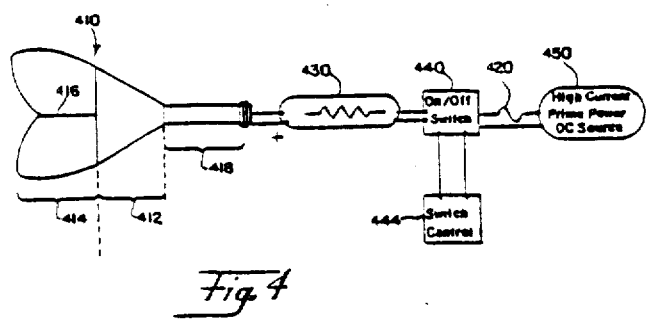

UNITED STATES PATENT AND TRADEMARK OFFICE
CERTIFICATE OF CORRECTION

PATENT NO. : 5,142,861

DATED : September 1, 1992

INVENTOR(S) : Rex L. Schlicher et al

It is certified that error appears in the above-identified patent and that said Letters Patent is hereby corrected as shown below:

```
Drawing sheet 5 should be deleted (duplicate of sheet 4).
Column 1, line 19, --would-- should follow "need".
Column 1, line 22, --planet-- should precede "earth".
Column 2, line 34, --(Method-- should precede "and)".
Column 3, line 5, "fi" should read --field--.
Column 3, line 10, --field-- should follow "magnetic".
Column 4, line 8, "A" should read --AC--.
Column 4, line 18, "s" should read --shown--.
Column 4, line 29, "332" should read --336--.
Column 4, line 53, a colon should follow "antenna".
Column 4, line 61, "azimuth" should read --azimuthal--.
Column 5, line 2, a comma should follow "structure".
Column 5, line 9, "ret" should read --return--.
Column 5, line 13, --be-- should follow "should".
Column 5, line 28, a comma should follow "respectively".
Column 5, line 39, --714-- should follow "paths"
Column 6, line 6, --a-- should follow "and".
Column 6, line 30, the comma should be a period.
Column 7, line 24, "an" should read --and--.
Column 7, line 25, "w" should read --with--.
Column 7, line 42, --present-- should follow "J".
Column 7, line 57, "o" should read --of--.
Column 9, lines 2-3, "Sons, Inc., New York, NY, USA 1965,
     p. 30.)." should be deleted.
Column 9, line 19, --as-- should follow "such".
Column 9, line 35, a comma should follow "temperatures".
Column 9, line 58, "or" should read --of--.
Column 9, line 60, a comma should follow "pulse".
Column 10, line 54, a comma should follow "descriptions".
Column 10, line 67, --bounded-- should precede "surface".
```

UNITED STATES PATENT AND TRADEMARK OFFICE
CERTIFICATE OF CORRECTION

PATENT NO. : 5,142,861

DATED : September 1, 1992

INVENTOR(S) : Rex L. Schlicher et al

It is certified that error appears in the above-identified patent and that said Letters Patent is hereby corrected as shown below:

```
Column 11, line 17, --various-- should precede "antennas".
Column 11, line 47, "the" should read --these--.
Column 11, line 49, "w" should read --with--.
Column 12, line 15, "claim" should read --claims.--.
Column 12, line 22 (claim 1), the comma should be deleted.
Column 12, line 50 (claim 1), --path-- should follow "return".
Column 13, line 3 (claim 7), "th" should read --the--.
```

Signed and Sealed this

Fourteenth Day of June, 1994

Attest:

BRUCE LEHMAN

Attesting Officer

Commissioner of Patents and Trademarks